United States Patent Office 3,373,766
Patented Mar. 19, 1968

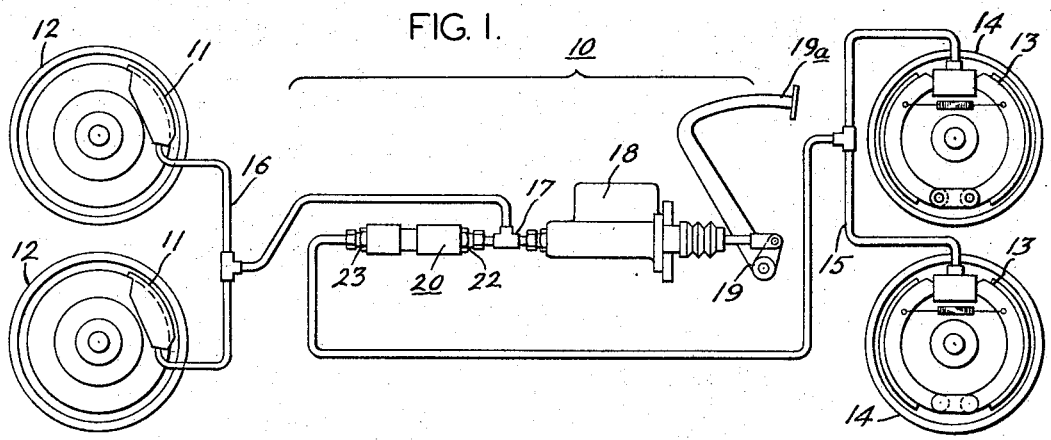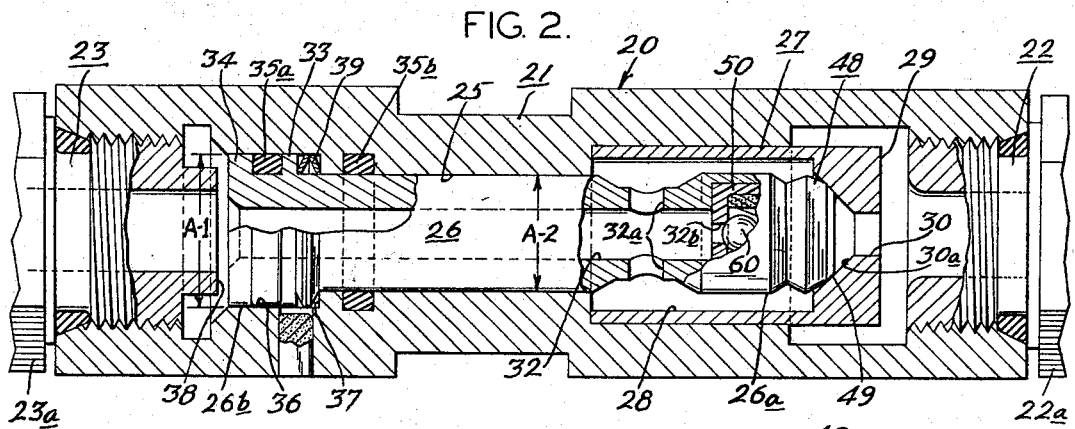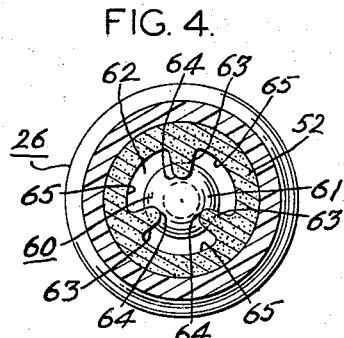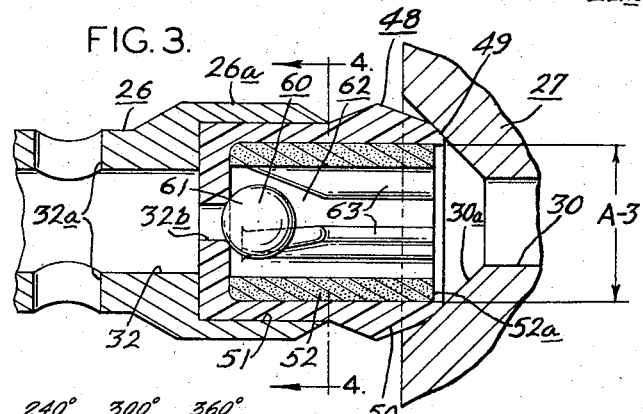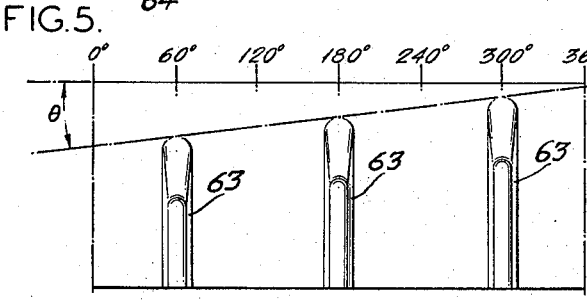

3,373,766
BRAKE PROPORTIONING VALVES
Roger E. Doerfler, Baltimore, Md., assignor to Hydrasearch Co., Inc., Annapolis, Md., a corporation of Maryland
Continuation-in-part of application Ser. No. 469,271, July 2, 1965. This application Oct. 22, 1965, Ser. No. 502,264
8 Claims. (Cl. 137—494)

ABSTRACT OF THE DISCLOSURE

Apparatus for proportioning hydraulic brake pressure to a wheel pair of a motor vehicle, the apparatus including a spool mounted in the bore of a body having an inlet and outlet end. The spool, responsive to an increase in pressure at the inlet end, moves towards the inlet until it seals off the inlet pressure and prevents further communication between the inlet and outlet until an increased pressure is placed on the inlet end of the spool. Thereafter pressure increases to the wheel pair at a fixed percentage of the inlet pressure increase rate. The improvement includes a novel check valve for inhibiting flow or pressure communication between the inlet and outlet when the spool is sealing the inlet, and to permit flow upon release of pedal pressure from the master cylinder.

---

This application is a continuation-in-part of application S.N. 469,271, filed on July 2, 1965.

The present invention relates to a proportioning valve for automotive brake systems and more particularly to improvements in a proportioning valve which provides automatically a programmed but variable differential hydraulic pressure between the front and rear brakes of a hydraulic brake system.

As set forth in the above-mentioned copending application, conventional automotive braking systems for vehicles having front mounted engines require differential braking forces in order that the vehicle may be stopped smoothly and that the brakes themselves may wear evenly. As weight distribution in most front engine vehicles is approximately 60:40, the brakes mounted on the front wheels of the vehicle must provide 60% of the total braking force while the brakes mounted on the rear wheels must afford 40% of the braking force. In the conventional motor vehicle this is accomplished by providing 60% of the total brake area on the front brake shoes and 40% of the total brake area on the rear brake shoes. In this manner equal static hydraulic pressure may be applied to the rear and forward brake cylinders while the differential areas compensate for the differences in weight distribution.

In certain instances it is desirable to combine, in a hybrid type brake system, disc type brakes on the wheels of the vehicle carrying more weight (typically the front wheels), with conventional shoe type brakes on the rear of the motor vehicle. As is well known, the disc brake allows an increase in applied braking pressure and thus an increase in the rolling friction of the tires against the surface upon which they are riding, without suffering the deleterious effects of brake lock which occurs with shoe type brakes. Further, with disc type brakes, even with excessive usage, brake fade is almost non-existent. However, as may be imagined hybrid brake systems combining disc and shoe type brakes create serious problems as to differential braking pressures between that required by the shoe and disc brake. It has been found that simply providing a difference in brake area between the disc and shoe type brakes is not a practical solution and thus it becomes necessary to provide a valving system which permits increased pressure to be applied to the disc type brakes, in certain instances, above that applied to the shoe type brakes, and on a proportional basis.

In the afore-mentioned copending application, a proportioning valve is described which proportions hydraulic pressure to one of brake systems when it is desired to increase the pressure on the other system to compensate for different types of systems located in the front or rear and/or differences in weight distribution in the vehicle to which it is connected.

In the proportioning valve of the copending application a valve body is illustrated having a hydraulic fluid inlet and a hydraulic outlet with a spool which is movable between a first position adjacent the outlet and a second position adjacent the inlet. This valve is also provided with connecting means located interiorly of the spool to permit hydraulic communication between the outlet and the inlet when the spool is in its first position and sealing means such as a check valve to seal the connecting means when the spool is in its second position. As described, the spool itself has a proportioning ratio between the end thereof exposed to the outlet and the end exposed to the inlet such that the hydraulic force exerted on the spool at the outlet is greater per unit area than the hydraulic force exerted upon the spool at the inlet. In this manner, the spool moves from its first position to the second position.

In the valve as above-described a problem is encountered in the check valve which sealed the connecting means when the spool moves to the second position. The problem encountered is caused by mis-alignment of the check valve due to dirt or impurities which occur in the hydraulic lines, and deposit in the seat of the check valve. In this manner communication between the outlet and the inlet is permitted, regardless of the position of the valve spool, thus defeating the very purpose of the valve.

In view of the above it is a principal object of the present invention to provide a novel check valve particularly adapted for use in a hydraulically operated proportioning valve such as that defined in the afore-mentioned co-pending application.

Another object of the present invention is to provide a check valve which will automatically position itself to seal the connecting means interiorly of the spool at the proper time in the valve's sequential operation.

Still another object of the present invention is to provide a check valve which will rotate to a new seating position upon release and re-application of hydraulic pressure.

Other objects and a fuller understanding of the invention may be had by referring to the following specification taken in conjunction with the accompanying claims and drawing in which:

FIG. 1 is a schematic diagram of a brake system having conventional shoe and drum, rear mounted brakes, and conventional front mounted disc brakes and incorporating a proportioning valve constructed in accordance with the present invention;

FIG. 2 is an enlarged fragmentary sectional view of the proportioning valve illustrated in FIG. 1;

FIG. 3 is an enlarged fragmentary sectional view of a portion of the proportioning valve illustrated in FIG. 2;

FIG. 4 is a sectional view taken along line 4—4 of FIG. 3; and

FIG. 5 is a development of a portion of the valve shown in FIGS. 2, 3 and 4.

For ease of reading, the following specification is broken into three sections, "Introduction," "The Proportioning Valve" and "The Check Valve."

Introduction

Referring now to the drawings, and especially FIG. 1, a brake system 10 is schematically illustrated therein, comprising, in the present instance, caliper type disc brakes 11 mounted on front wheels 12, and shoe type brakes 13 mounted on rear wheels 14. Connecting the shoe brakes 13 is hydraulic piping 15 which emanates from a proportioning valve 20 embodying interiorly thereof novel sealing means constructed in accordance with the present invention. Connecting the disc brakes 11 is hydraulic piping 16 emanating from a T 17 interconnecting the proportioning valve 20 and a conventional master cylinder 18. As is usual, the master cylinder 18 is actuated by a linkage 19 and the customary foot pedal 19a.

The proportioning valve

The proportioning valve 20, with the exception of the novel sealing means or check valve, is substantially as set forth in the aforementioned copending application, but is set forth hereinafter for purposes of clarity.

The proportioning valve 20 is operative to proportion and program the sequential application of hydraulic pressure to the shoe type brakes 14, solely by hydraulic imbalance. To this end, the valve 20 comprises a valve body 21 having a hydraulic fluid inlet 22 and at least one hydraulic fluid outlet 23. As illustrated in FIG. 1, the outlet 23 is connected to the rear shoe brakes 13 while the inlet 22 is connected through the T 17 to the master cylinder 18. In the present instance, the inlet and outlet connections to the body 21 comprise nipples 22a and 23a respectively. Between the inlet 22 and the outlet 23 is a bored hole 25 having slidingly mounted therein a spool 26, the spool having an inlet end 26a and an outlet end 26b and movable between a first position adjacent the outlet 23 (i.e. with reference to FIG. 2), to the left and a second position to the right. Adjacent the inlet 22 and mounted within the body is a sleeve 27 having a hollow interior forming a first chamber 28, communicative at one end through a passage 30 with the inlet 22, and circumscribing the inlet end 26a of the spool 26. To provide communication between the inlet 22 and the outlet 23 so that hydraulic pressure applied at the inlet may also be applied at the outlet, the spool 26 contains means defining an aperture or conduit 32 connecting the chamber 28 and the outlet 23 via radially extending openings 32a and an axial conduit extension 32b.

At the outlet end 26b of the spool 26 are a pair of spaced annular shoulders 33 and 34 having an annular seal 35a, such as an O-ring, mounted therebetween. The shoulders 33 and 34 are positioned in a second chamber 36 formed in the body 21 and having an axially spaced radially extending end wall 37, the forward end of the nipple 23a forming the other end wall 38. A second seal 35b is positioned adjacent the wall 37 and sealingly engages the exterior of the spool 26. Between the end wall 37 and the first shoulder 33 of the spool 26 is biasing means, in the present instance a conical compression spring 39 which tends, prior to the application of hydraulic pressure to the spool through the inlet 22, to keep the spool in its first position, i.e. towards the left.

In order to permit axial movement of the spool 26 between its first and second positions, solely by hydraulic imbalance, and to permit the movement of the spool to overcome the compression of the spring 39, the area of the second shoulder 34, exposed to the hydraulic fluid at the outlet 23 and designated A-1 for purposes of identification, is greater than the area A-2 exposed to hydraulic pressure from the inlet 22. Thus, upon receipt of sufficient pressure to overcome the spring force, the spool moves to the right until the resultant hydraulic force exerted against the area A-1 is equal to the sum of the resultant hydraulic force exerted against the area A-2 and the spring force. At this position a state of balance will occur.

At a predetermined pressure it is desirable to lower the rate at which the pressure applied to the rear shoe brakes 13 through the outlet 23 increases, while maintaining the pressure rate increase to the forward disc brakes, from the master cylinder, undiminished. One of the reasons for proportioning the pressure in this manner is that increased braking pressure may be applied to disc brakes without locking the brakes which is not true of shoe type brakes. Thus the point at which the hydraulic pressure rate increase, going to the shoe type brakes, should taper off, is one that must be picked for each individual system dependent upon the surface area of the shoes and other well known factors. In the present instance, the proportioning valve 20 programs the decrease in hydraulic pressure rate to the rear brakes 13. As hydraulic pressure increases, the spool 26 gradually moves to the right until it reaches a position closing off the first chamber 28. To this end, the inlet end 26a of the spool 26 has a nose cone 48 connected thereto, which nose cone includes a conical or tapered lip portion 49 for seating in a like conical seat 30a in the passage 30 of the sleeve 27.

As set forth in the copending application, the nose cone 48 comprises a cylindrical insert 50 connected to one end of the spool 26, in the present instance force fitted inside a cylindrical receiving chamber 51, and having interiorly mounted therein a stiffening member 52. (See FIG. 3.) It should be noted that the stiffening member 52 has a leading edge 52a spaced axially and interiorly of the conical lip 49 of the cylindrical insert 50. Preferably the cylindrical insert 50 is constructed of a stiff yet resilient material such as nylon, while the stiffening member 52 is preferably composed of a material that is hydraulically transparent to support the cylindrical insert 50. Such a hydraulically transparent material is sintered porous bronze which tends to restrain the cylindrical insert 50 upon contact of the tapered lip 49 with its associated seat 30a in the sleeve 27, while permitting the pressure to act on the internal diameter of the cylindrical insert and thus aid the sealing action of the lip 49 against the seat 30a.

When the spool 26 is in its second position (i.e. to the right) and the nose cone 48 is positioned in the seat 30a of the sleeve 27, as illustrated in FIGS. 2 and 3, a different area, designated in the present instance A-3, is exposed to the hydraulic pressure from the master cylinder 16. In the present instance, the area A-3 is less than either the area A-1 or A-2, whereby, after the valve has reached the second position, the pressure at the outlet 23 will remain at the pressure which causes the spool 26 to reach the second position, plus the ratio of A-3:A-1 times the difference between the new hydraulic pressure at the inlet 22 and the pressure of closing.

The check valve

In order that the conduit 32 is sealed off upon the spool 26 reaching its second position and the nose cone 48 being seated in the seat 30a of the sleeve 27, and at the same time to provide means for permitting a rapid decrease in the fluid pressure at the rear brake shoes upon release of the foot pedal 19a, novel sealing means in the present instance a check valve 60, is provided interiorly of the stiffening member 52 and positioned to close off the conduit 32.

As illustrated in FIG. 2, when the spool 26 is in its first position hydraulic pressure may reach the conduit 32 through the radially extending apertures 32a which communicate with the chamber 28. However, when the spool is in its second position and the nose cone 48 is seated in its seat 30a of the sleeve 27, the sealing means 60 must be operative to prevent fluid or hydraulic pressure from communicating through the extension 32b of the conduit 32. To this end, the check valve comprises resilient ball 61, in the present instance composed of ethylene propylene and having a hardness of approximately 70 durometers, is flotably mounted in the stiffening member 52. The resilient ball 61 is loosely contained in a pocket 62 diverging tapered splines, in the present instance three having angulated splines 63 diverging axially outward away from the inlet. As illustrated in FIGS. 3 and 4, stiffening member 52 contains lands 64 and axially extending grooves 65, the radially diverging or angulated splines 63 being formed at the terminus of the lands 64. In this manner the splines 63 limit the axial movement of the resilient ball 61 in the stiffening member 52.

In order to prevent wedging of the ball 61 against the splines 63, while at the same time limiting the movement of the ball axially of the stiffening member 52, the included angle between the splines should preferably be not less than 20° and not greater than 180°. An included angle between the splines of less than 20° may cause wedging of the resilient ball 61 within the splines while an included angle of 180° would allow the ball to move radially within the stiffening member 52 and prevent it from properly seating in the conduit extension 32b. In the present instance, in the range of pressures normally encountered in a hybrid brake system of the afore-mentioned type as well as the properties of the material of which the ball is fabricated, an included angle of approximately 40° limits the axial movement of the ball and at the same time helps center the ball to insure proper seating in the conduit extension 32b.

It should be recognized that in systems encountering lower pressure or containing a different liquid, i.e. other than a hydraulic brake fluid, a resilient ball having a different composition and physical properties may be used. In addition, the properties of the ball may permit variation in the angular relationship between the splines.

To prevent excessive wear on one surface of the resilient ball 61, and at the same time to automatically permit a new seating surface to be exposed to the conduit extension 32b, upon release and reapplication of pressure to the inlet 22 from the master cylinder 18, it is desirable to offset the splines 63 axially of the stiffening member 52. Such an embodiment is illustrated in the development of FIG. 5 wherein the leading edge of the spline is offset axially of the stiffening member 52 by the angle theta. In this manner upon release of the brake pedal 19a the pressure on the portion of the ball exposed to the conduit 32 overcomes the inlet pressure causing the ball to unseat and move into the pocket 62. By axially offsetting the splines, the ball will strike one of the splines earlier than the others which creates a rolling effect which will cause the ball to incur a new seating surface in the conduit 32 upon reapplication of brake pressure in the entry 22.

Thus the present invention provides a check valve which due to its free movement and special design insures proper seating of the valve while substantially decreasing the opportunity for dirt or other impurities to "hang up" on the valve seat and cause improper functioning of the proportioning valve with which it is associated.

Thus although the invention has been described with a certain degree of particularity, it should be understood that the present disclosure is only exemplary of the invention, and that numerous changes in the details of construction, and the combination and arrangement of parts may be made without departing from the spirit and scope of the invention as hereinafter claimed.

In the claims:

1. In a hydraulically operated proportioning valve comprising a body having hydraulic fluid inlet means and hydraulic fluid outlet means; spool means movable between a first position adjacent said outlet and a second position adjacent said inlet; connecting means interiorly of said spool to permit hydraulic communication between said outlet and said inlet when said spool is in its first position, said spool having a proportioning ratio between the end thereof exposed to said outlet and the end thereof exposed to said inlet such that the hydraulic force exerted on said spool at said outlet is greater than the hydraulic force exerted upon said spool at said inlet: and sealing means operative to seal said connecting means when said spool is in its second position and to release and permit fluid communication thereby upon release of hydraulic pressure at said inlet; said sealing means comprising a check valve means including a pocket in said spool means adjacent said inlet and communicative with said inlet and said connecting means, said pocket having angulated splines diverging axially outward away from said inlet and a resilient ball loosely constrained in said pocket, operative, when said spool is in the second position, upon a greater pressure being exerted at said inlet than at said outlet to seal said connecting means, and upon an increased pressure being exerted at said outlet than at said inlet to permit fluid communication between said connecting means and said inlet.

2. In a hydraulically operated proportioning valve in accordance with claim 1 wherein said splines of said pocket limit the axial movement of said ball in said pocket towards said inlet, and a seat for said ball connected to and adjacent said connecting means.

3. In a hydraulically operated proportioning valve in accordance with claim 2 wherein at least one of said splines is axially offset to impart a rolling motion to said ball upon release of pressure at said inlet.

4. In a hydraulically operated proportioning valve in accordance with claim 1 wherein said spool includes biasing means connected thereto maintain said spool in the first position prior to the application of hydraulic pressure to said inlet, sleeve means circumscribing the inlet end of said spool and defining a chamber having a passage therein which communicates with said inlet, and a seat in said sleeve; including a nose cone on the inlet end of said spool; said nose cone having a lip portion to engage said seat in said chamber to seal said chamber when said spool is in its second position, and comprising a hollow cylindrical member connected to said spool and a tubular stiffener inserted in said member having a leading edge lying closely adjacent said lip of said cone and axially spaced interiorly of said member, and lands and grooves in said stiffener and axially thereof terminating in said diverging splines forming said pocket.

5. In a proportioning valve in accordance with claim 4 wherein said splines are axially offset whereby upon release of hydraulic pressure at said inlet said ball moves in said pocket striking one spline prior to striking the other spline causing said ball to rotate, thus exposing a new seating portion for said ball upon reapplication of pressure.

6. In a proportioning valve in accordance with claim 5 wherein said stiffening member is composed of a hydraulically transparent material and said hollow cylindrical member is stiff yet resilient.

7. In a proportioning valve in accordance with claim 2 wherein said ball is composed of ethylene propylene having a hardness of approximately 70 durometers.

8. In a proportioning valve in accordance with claim 2 wherein the included angle between said splines forming said pocket is between 20° and 180°.

References Cited

UNITED STATES PATENTS

| Re. 22,180 | 9/1942 | Otis | 137—512.2 |
| 2,529,731 | 11/1950 | Hollerith | 137—509 |
| 2,991,797 | 7/1961 | Baldwin | 303—6 XR |
| 3,163,473 | 12/1964 | Stelzer | 303—6 |

FOREIGN PATENTS

| 969,901 | 9/1964 | Great Britain. |

M. CARY NELSON, *Primary Examiner.*

R. J. MILLER, *Assistant Examiner.*